J. G. BOSS.
NON-SKIDDING TIRE.
APPLICATION FILED SEPT. 1, 1910.
1,040,865.
Patented Oct. 8, 1912.
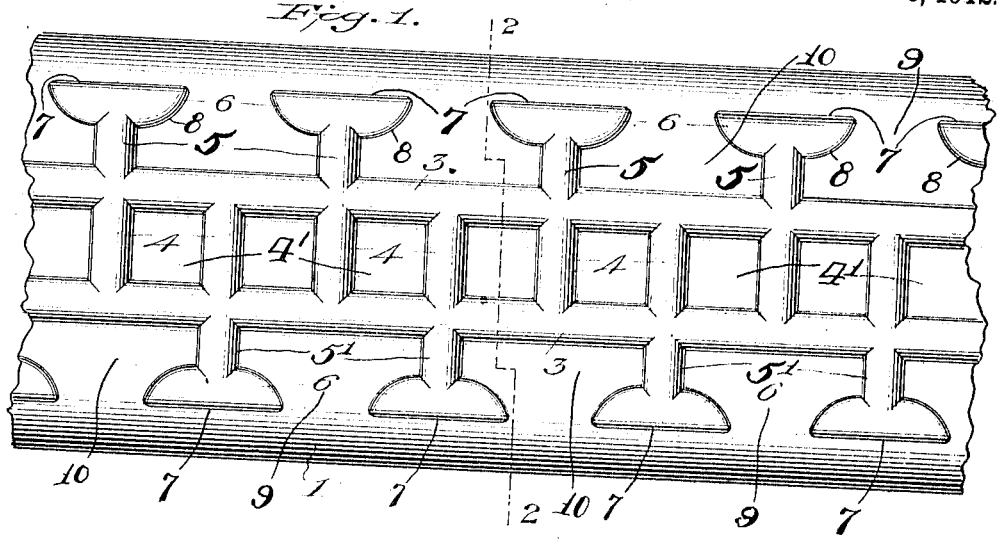
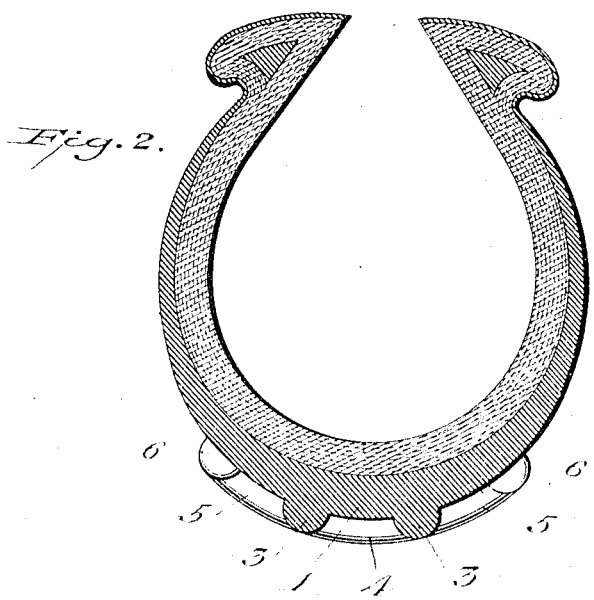

UNITED STATES PATENT OFFICE.

JOHN G. BOSS, OF DENVER, COLORADO.

NON-SKIDDING TIRE.

1,040,865.  Specification of Letters Patent.  Patented Oct. 8, 1912.

Application filed September 1, 1910. Serial No. 580,097.

*To all whom it may concern:*

Be it known that I, JOHN G. BOSS, a citizen of the United States of America, residing at the city and county of Denver and State of Colorado, have invented a new and useful Non-Skidding Tire, of which the following is a specification.

This invention relates to tires such as are used on automobiles, and the like, and has special reference to a tire provided with an anti-skidding tread.

The principal object of the invention is to improve the general construction of tires of this character so that the portions of the tire which are intended to prevent skidding will be thoroughly supported while, at the same time, caking of mud, snow, and ice about these portions will be obviated.

With the above and other objects in view, the invention consists in general of certain novel constructions, combinations and arrangements of parts, as will be hereinafter fully described, illustrated in the drawing, and specifically claimed.

In the drawings, like characters of reference indicate like parts in the several views, and Figure 1 is a face view of a portion of a tire constructed in accordance with this invention. Fig. 2 is a section on the line 2—2 thereof.

In the embodiment of the invention herein shown there is provided a tire having a tread portion 1 of some elastic material and preferably forms an integral part of a shoe for a pneumatic tire or an integral part of a solid rubber tire. Extending longitudinally in spaced relation to the center line of the tread 1 is a pair of ribs 3 and these ribs are continuous throughout the circumference of the tire. At spaced intervals the ribs 3 are connected by short transverse ribs 4 so that a series of square or substantially square pockets 4' are formed circumferentially around the tire. In alinement with every second rib 4 there projects from one of the ribs 3 a short stout rib 5 and in similar alinement with the remaining ribs 4 there projects from the other rib 3 a short stout rib 5'. At the ends of these ribs 5 and 5' there are provided heads 6 having spaced outer edges 7 and curved inner faces 8. The ends of these heads are spaced to leave openings 9 therebetween so that the heads, stems 5 and 5, and ribs 3 form a series of open-mouthed pockets 10 on each side of the pair of ribs 3. Now, by means of this construction it will be seen that the ribs 4 act to prevent slipping of the tire rotatably while the straight sides of the heads 6 and ribs 3 prevent slipping of the tire sidewise or skidding.

It will be noted that when the tire is distorted under the influence of side stress the weight is thrown on the two ribs 3 and one of the set of heads 6, the stress causing the tire to move bodily sidewise. This being the case it will be noted that the straight edges of the heads 6 come in contact with the ground and the outer side of the rib 3 to which the set of heads 6 just mentioned is connected will act to resist this side-slipping and so also will the inner side of the rib 3 remaining. There will thus be brought on the head 6 a considerable strain but by reason of the peculiar formation of the heads as well as by reason of the short stout stems 5 and 5' being in alinement with the cross ribs 4 the stress on the heads will be distributed so that these heads will be assisted by both ribs 3 and supported by their respective short stout ribs 5 and 5' as the case may be. Now, since it is upon the heads 6 that the greater part of the strain comes in skidding or in an attempt to skid it is necessary that these heads be curved and properly arranged as otherwise they are liable to tear loose. For instance if the heads were made of great length, whether extending only in one direction or in both directions the outer ends would be so badly supported that they would unquestionably be torn away from the body of the tread. Furthermore, if the stems 5 and 5' were not alined with the cross members 4 the stress would be brought only on one of the ribs 3 and would tend to tear the heads, stem, and rib apart much more quickly than by distributing the stress to both the ribs 3 and cross rib 4. Furthermore without the heads 6 constructed as set forth, in muddy and snowy weather the pockets 10 would pack full of mud or snow under the skidding action and when the tire resumed its normal shape these pockets would retain the mud or snow. However, by reason of the pockets having open mouths 9 caused by the spaced arrangement of the heads, these pockets will not retain mud and snow, but the same will drop out readily upon the tire resuming its normal position such as indicated in Fig. 2.

There has thus been provided a simple and efficient device of the kind described, and for the purpose specified.

Having thus described the invention, what is claimed as new, is:—

A tire tread comprising a tread body provided with a pair of circumferentially disposed parallel ribs extending entirely around the tire in spaced relation to the center line thereof, spaced ribs connecting the pair of ribs to divide the space between said pair into a series of substantially square pockets, short stout ribs in staggered relation on each side of said pair of ribs, the ribs on one side being alined with every other transverse rib, the short stout ribs on the remaining side being alined with the remaining transverse ribs, and heads each connected to one of said short stout ribs and having their ends in spaced relation to provide open-mouthed pockets, the outer sides of all of said heads being straight and in alinement and the under sides of all of said heads being curved from the straight portion whereby to provide a ground gripping side and walls for the pocket mouths adapted to readily release material held in said pockets.

In testimony whereof I affix my signature in presence of two witnesses.

JOHN G. BOSS.

Witnesses:
G. SARGENT ELLIOTT,
ADELLA M. FOWLE.